Feb. 21, 1950 K. KHARIBIAN 2,497,996
REVOLVING DUSTER
Filed July 30, 1946

INVENTOR.
KRIKOR KHARIBIAN
BY *Victor J. Evans & Co.*
ATTORNEYS

Patented Feb. 21, 1950

2,497,996

UNITED STATES PATENT OFFICE 2,497,996

REVOLVING DUSTER

Krikor Kharibian, Boston, Mass.

Application July 30, 1946, Serial No. 687,139

1 Claim. (Cl. 306—3)

My present invention relates to an improved duster and more particularly to a duster or mop mounted for rotary movement with relation to the handle as the duster is moved back and forth by the operator.

By means of the ball bearing journal between the duster body and the handle, the duster will have a minimum of frictional resistance and will be free to rotate and thus increase the efficiency of the dusting operation.

In the accompanying drawings I have illustrated one complete example of the physical embodiment of my invention according to the best mode I have thus far devised but it will be understood that various changes and alterations may be made in the exemplified structure within the scope of the appended claim.

Figure 1:
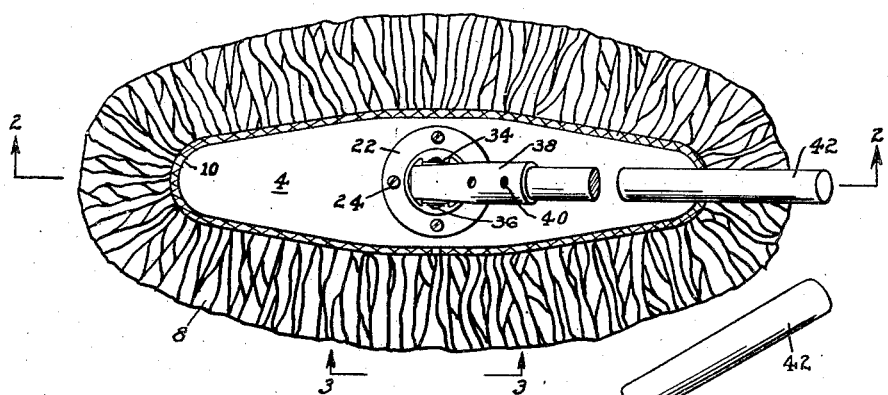
Figure 1 is a top plan view of the rotary duster of my invention.
Figure 2:
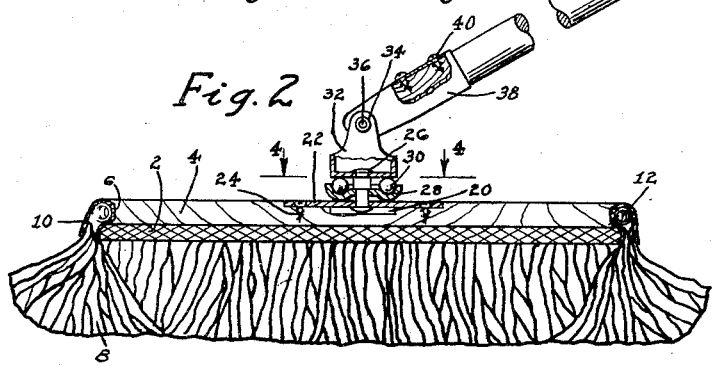
Figure 2 is a transverse vertical sectional view at line 2—2 of Figure 1.
Figure 3:
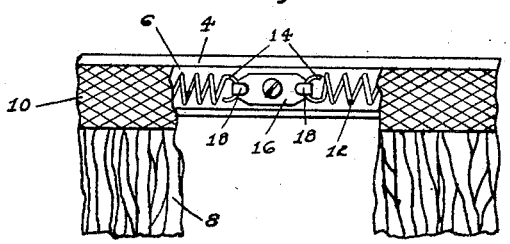
Figure 3 is a partial side elevational view.
Figure 4:
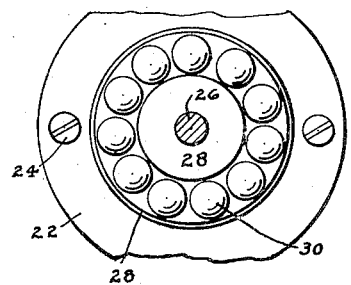
Figure 4 is an enlarged detail view of the bearing structure in section, taken on line 4—4 of Fig. 2.

Referring now to the drawings in detail wherein like characters indicate like parts, I have illustrated the duster of my invention consisting of a lowermost plate of metal or other suitable material 2 with a covering base plate 4 preferably of wood and formed with a peripheral groove 6.

The mop or duster 8 is fashioned with a looped edge 10 through which is located the coil spring 12. The spring is fashioned with end hooks 14 secured to the attaching plate 16 by means of lugs 18.

Centrally of the base plate 4 I have formed a circular depression 20 over which is mounted the plate or disk 22 and secured to the cover plate 4 by means of screws 24. A stud 26 extends vertically upward from the disk 22 and upon this stud I have placed a ring 28 having an annular groove therein forming a ball race for the ball bearings 30. A cap 32 is secured on the stud and forms the upper bearing surface for the balls 30.

This cap 32 is formed with upstanding ears 34 through which the bolt 36 is located to secure the handle shank 38. The screws 40 retain the end of the handle 42 within the shank.

As stated above the duster when used and reciprocated by the operator will revolve with relation to the handle and will provide an improved manner of dusting over the conventional dusters heretofore used.

Having thus fully described my invention, what I claim as new and desire to secure by Letters Patent is:

In a mop mounting, the combination which comprises a mop head having a base plate to which dusting and mopping elements are attached, a disk having a stud extended perpendicularly therefrom mounted on the said base plate, a ring having an arcuate annular groove in one face thereof providing a ball race positioned on the stud and against the said base plate, balls positioned in the race of said ring, a cup-like cap having spaced upwardly extended ears rotatably mounted on said stud and seated on the balls in the race of the ring, and a handle having a shank pivotally mounted between the ears of said cap whereby a swivel connection is provided between the handle and the mop head.

KRIKOR KHARIBIAN.

REFERENCES CITED

The following references are of record in the file of this patent:

UNITED STATES PATENTS

| Number | Name | Date |
|---|---|---|
| 1,008,048 | Mueller | Nov. 7, 1911 |
| 1,563,745 | Hillyard | Dec. 1, 1925 |
| 1,839,266 | Sager | Jan. 5, 1932 |
| 1,921,637 | Ranish | Aug. 8, 1933 |
| 1,989,825 | Schaefer et al. | Feb. 5, 1935 |
| 2,382,679 | Tollman | Aug. 14, 1945 |
| 2,408,766 | Fatland | Oct. 8, 1946 |

FOREIGN PATENTS

| Number | Country | Date |
|---|---|---|
| 515,994 | Great Britain | Dec. 20, 1939 |